United States Patent [19]

Kruschwitz

[11] 4,311,747

[45] Jan. 19, 1982

[54] CHANNEL-SHAPED SEALING AND FINISHING STRIPS

[75] Inventor: Werner Kruschwitz, Viersen, Fed. Rep. of Germany

[73] Assignee: Draftex Development AG, Zug, Switzerland

[21] Appl. No.: 118,329

[22] Filed: Feb. 4, 1980

Related U.S. Application Data

[63] Continuation of Ser. No. 947,113, Sep. 29, 1978, abandoned.

[30] Foreign Application Priority Data

Oct. 4, 1977 [GB] United Kingdom ............... 41092/77

[51] Int. Cl.³ ............................................. E06B 7/23
[52] U.S. Cl. ..................................... 428/122; 49/490; 52/716
[58] Field of Search ................... 428/122, 40, 83, 122, 428/358; 49/490, 491; 52/716, 717

[56] References Cited

U.S. PATENT DOCUMENTS

| | | | |
|---|---|---|---|
| 2,115,449 | 4/1938 | Pradt | 428/40 X |
| 3,638,359 | 2/1972 | Kruschwitz | 49/490 |
| 4,067,146 | 1/1978 | Mesnel et al. | 49/490 |
| 4,103,459 | 8/1978 | Barnerias et al. | 49/491 |
| 4,107,898 | 8/1978 | Andrzejewski et al. | 52/716 |
| 4,123,100 | 10/1978 | Ellis | 49/490 X |

Primary Examiner—Henry F. Epstein
Attorney, Agent, or Firm—Leydig, Voit, Osann, Mayer & Holt, Ltd.

[57] ABSTRACT

There is disclosed a flexible channel-shaped sealing or finishing strip in which a length of unvulcanized rubber (or like material) extends along the strip on part of the inside surface of the channel but so as to have a free surface facing the interior of the channel, the free surface in use making contact with and adhering to at least part of an edge over which the strip is fitted, so as to improve the gripping and sealing properties of the strip.

5 Claims, 3 Drawing Figures

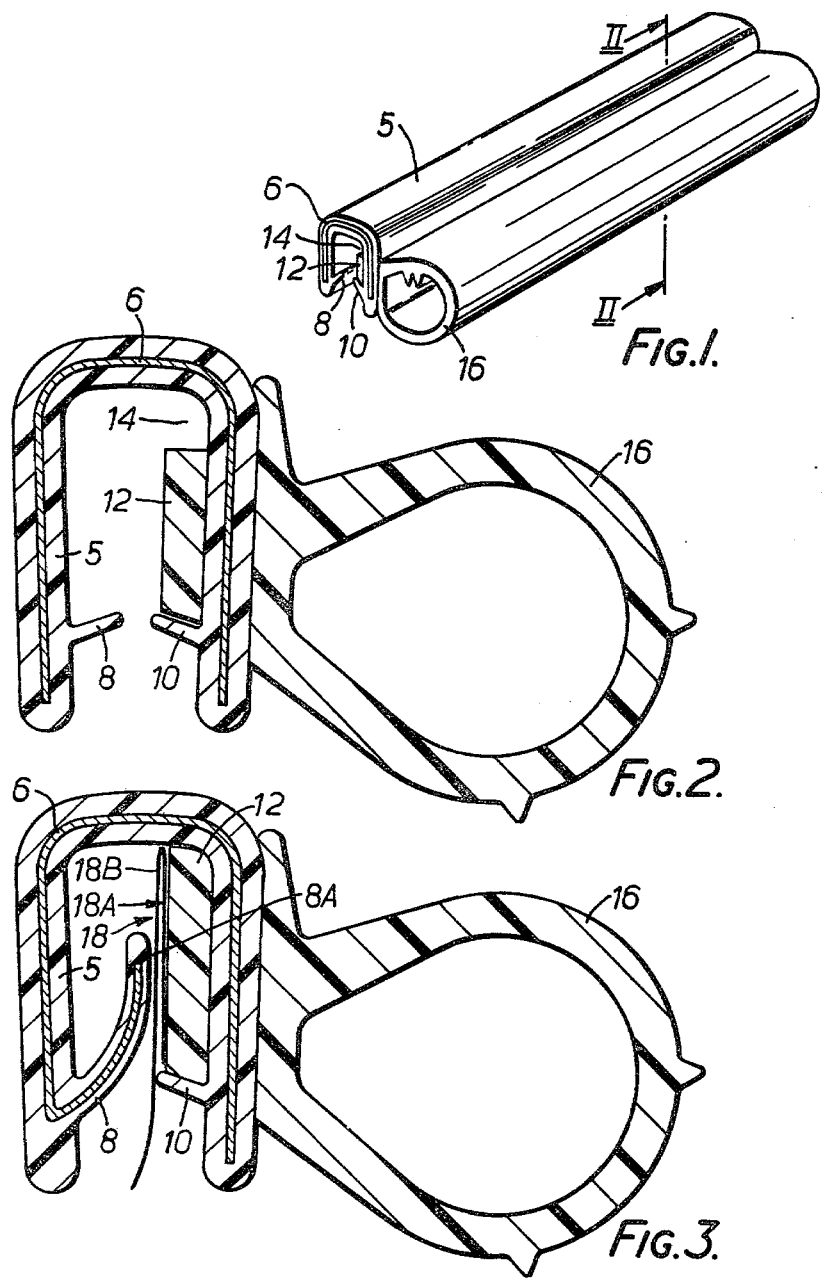

CHANNEL-SHAPED SEALING AND FINISHING STRIPS

RELATED APPLICATIONS

This application is a continuation of Ser. No. 947,113, filed Sept. 29, 1978, now abandoned.

BACKGROUND OF THE INVENTION

This invention relates to flexible channel-shaped sealing and finishing strips for use as draft excluding seals, beadings, flange finishers (for covering welded flanges), and the like. Such strips may be herein referred to generically as "sealing strips", and are particularly, though not exclusively, for use in vehicle body construction.

With such strips, it is important that they grip the mounting flange (or similar structure) on which they are mounted sufficiently strongly to resist rough treatment to which they may be subject in use.

It is known to reinforce such strips with resilient metal carriers and/or to provide gripping ribs running along the inside walls of the channel. These expedients are effective but may have the disadvantage of making it more difficult to fit the strip onto the mounting flange (or the like).

An object of the invention is to provide an improved channel-shaped sealing or finishing strip.

A more specific object is to provide such a strip which has improved gripping and sealing properties.

BRIEF SUMMARY OF THE INVENTION

According to the invention, there is provided a flexible channel-shaped sealing or finishing strip in which a length of unvulcanized rubber (or like material) extends along the strip on part of the inside surface of the channel but so as to have a free surface facing the interior of the channel, the free surface in use making contact with and adhering to at least part of an edge over which the strip is fitted.

DESCRIPTION OF THE DRAWINGS

A flexible channel-shaped sealing strip embodying the invention will now be described, by way of example only, with reference to the accompanying diagrammatic drawings in which:

Fig. 1 is a perspective view of one form of the sealing strip;

FIG. 2 is a cross-section on the line II—II of FIG. 1; and

FIG. 3 is a cross-section corresponding to FIG. 2 but showing modifications.

DESCRIPTION OF PREFERRED EMBODIMENTS

As shown, the sealing strip comprises channel-shaped plastics or similar material 5 in which is embedded a channel-shaped metal carrier 6 (FIG. 2). the metal carrier may take any suitable form. For example, it may comprise a series of side-by-side U-shaped elements (inverted in the Figures) which may be either completely disconnected from each other or perhaps connected by short flexible connecting links. Instead, for example, the carrier could be made of unapertured metal channel whose sides and base are corrugated. In a further example, the metal carrier could be made of wire elements or loops. In each case, the aim is for the carrier to support the sealing strip but still enable it to be sufficiently flexible to follow bends and curves in use. p Integral with the flexible material 5 are two gripping ribs 8 and 10 on the facing inside walls of the sealing strip.

Mounted on one inside wall of the channel is a length 12 of unvulcanized rubber, for example, unvulcanized butyl rubber, this rubber length being shaped to rest on the gripping rib 10 but to leave a space 14 between itself and the base of the channel. The length 12 holds itself in place by means of the inherent tackiness of the rubber owing to its unvulcanized state.

In addition, the flexible channel-shaped material 5 supports a soft sealing section 16, of tubular form in this example, which is attached to and runs along the outside of one wall of the channel.

In use, the sealing channel illustrated may be fitted onto the edge flange which runs around a door opening or similar opening in a motor vehicle body. The channel is sized so that the flange can fit within the mouth of the channel but with the gripping ribs 10 and 12 pressing into sealing and gripping relationship with the opposite faces of the flange. In addition, however, this fitting action causes the length 12 to be pressed between the contacting face of the flange and the inside walls of the channel which the length 12 contacts. The resultant reduction in thickness of the length 12 produces a compensating increase in its width which is accommodated by the space 14. Because of its inherent tackiness, owing to its unvulcanised state, the length 12 adheres to the contacting face of the flange, and the result is to produce a very efficient gripping and sealing action.

The tackiness of the unvulcanised rubber length 12 will be maintained substantially indefinitely, and the sealing and gripping action which it provides is therefore advantageous as compared with the sealing and gripping action which is intended to be obtained in other arrangements by the use of a mastic layer in the base or other position in the channel; such mastics are found to be unsatisfactory because they do not maintain their mastic properties indefinitely.

In use, the sealing section 16 becomes so positioned, when the channel 5 is mounted on the flange, that the door of the vehicle body opening closes onto the sealing section 16 which becomes compressed and provides a draft and weather seal around the opening. The sealing section 16 may have other forms and shapes, may be differently positioned on the channel 5 and may be dispensed with altogether in some other applications.

Various other modifications may be made.

For example, the length 12 of unvulcanised rubber may have a shape which is different from that shown.

There may be more than one gripping rib on each inside facing wall of the channel, or the gripping rib 8 may be dispensed with altogether. In a case where there is at least one gripping rib on each inside wall of the channel, there may be a length of unvulcanised rubber on each inside facing wall of the channel.

It is also possible to mount the length 12 of unvulcanised rubber on one or both inside facing surfaces of the channel when there are no gripping ribs provided.

The unvulcanized rubber length 12 may be mounted elsewhere within the channel, for example, on the inside of the base wall of the channel.

The sealing channel described may be manufactured by an extrusion process, and advantageously, a duplex extruder is used so as simultaneously to extrude the plastics or similar material 5 and the unvulcanized rubber strip 12.

Instead of unvulcanized rubber, other suitable material may be used for the length 12.

FIG. 3 shows two modifications.

In FIG. 3, the gripping rib 8 is extended and has embedded in it an extended part of the carrier 6. In addition, the length 12 of unvulcanized rubber is extended to fill the gap 14 (FIG. 2) and its free surface is covered with paper tape 18 (or tape of other suitable materal) which in fact is arranged in double thickness. One thickness 18A is firmly attached to and complete covers the free surface of the length 12. The other thickness 18B is folded over the thickness 18A and extends out through the mouth of the channel.

In use, the strip of FIG. 3 is particularly suited (though not limited to) application to rough or uneven flanges. The lengthened and strengthened gripping rib 8 provides better grip and sealing (partly by providing an extended, substantially flat, area 8A). The covering tape 18 helps, by covering the tacky surface of the length 12, to ease the process of fitting the strip onto the flange. When the strip has been fitted onto the flange, the tape 18 is then completely removed by pulling on the protruding part of the thickness 18C.

The strip of FIG. 3 can be modified by making the gripping rib 8 and the carrier 6 of the same form as shown in FIGS. 1 and 2.

The tape 18 can be arranged differently. It need not be in double thickness but merely single thickness and then removed by, for example, taking hold of an end region protruding from an end of the channel and pulling it out through the mouth of the channel.

In order to increase the tightness with which the strip grips the flange, a tool may be used to press the sides of the strip towards the flange. For example, a tool having rollers rotatably mounted about parallel axes to define a predetermined gap between their peripheries may be used, the tool in use being placed over the strip (when the latter is mounted on the flange) so that the facing roller peripheries contact opposite external side walls of the strip. As the tool is pulled along the strip, the rollers run along the side walls and press them towards each other. If such a tool is used, the sides of the strip can initially be splayed slightly outwards to aid the fitting of the strip onto the flange.

What is claimed is:

1. A flexible channel-shaped sealing strip, comprising channel-shaped flexible material, a supporting carrier of metal embedded in the flexible material, the flexible material defining respective gripping ribs running along opposite inside walls of the channel close to the open mouth of the channel for gripping and sealing against opposite side faces of a flange which the channel embraces in use, a length of solid unvulcanized rubber running on and along the length of the interior surface of one side wall of the channel and between the respective gripping rib on that wall and the base of the channel, the thickness of the rubber across the width of the channel being less than the extension of that rib across the width of the channel so that the rib protects the outermost side of the rubber when the sealing strip is placed on the said flange, the length of solid unvulcanized rubber having a free and inherently tacky surface facing across the interior of the channel towards the opposite inside wall thereof, the free surface in use making contact with and adhering to at least part of one said side face of the flange so as to seal to and grip the said side face, the area of the said part of one said side face of the flange being a substantial proportion of the total area of the portion of that side face which is within the said channel, and a sealing section of soft material running along and attached to the outside surface of the channel.

2. A strip according to claim 1, in which the length of the unvulcanized rubber is unvulcanized butyl rubber.

3. A strip according to claim 1, including a removable protective covering temporarily over and covering the free surface of the length of solid unvulcanized rubber, the covering being removable when the strip has been fitted onto the said flange in use.

4. A strip according to claim 1, in which the gripping rib positioned on and running along the said opposite inside wall defines a substantially flat area facing the free surface of the length of solid unvulcanized rubber.

5. A strip according to claim 4, in which the said gripping rib running along the said opposite inside wall is reinforced internally with resilient metal.

* * * * *